(12) United States Patent
Heidari et al.

(10) Patent No.: US 6,512,739 B1
(45) Date of Patent: Jan. 28, 2003

(54) METHOD AND APPARATUS FOR DOWN CONVERSION WITHIN AN X-DSL RECEIVER

(75) Inventors: Sam Heidari, Fremont, CA (US); Behrooz Rezvani, Pleasanton, CA (US)

(73) Assignee: Ikanos Communications, Inc., Fremont, CA (US)

( * ) Notice: Subject to any disclaimer, the term of this patent is extended or adjusted under 35 U.S.C. 154(b) by 6 days.

(21) Appl. No.: 09/779,255

(22) Filed: Feb. 7, 2001

Related U.S. Application Data (63) Continuation of application No. 09/757,008, filed on Jan. 8, 2001.
(60) Provisional application No. 60/175,011, filed on Jan. 7, 2000.

(51) Int. Cl.[7] .............................................. H04L 27/22
(52) U.S. Cl. ...................... 370/210; 375/373; 370/210; 370/466; 370/480
(58) Field of Search ................................. 370/203, 210, 370/464, 466, 480, 493, 494; 375/316, 320, 377

(56) References Cited

U.S. PATENT DOCUMENTS 6,240,150 B1  5/2001  Darveau et al.

OTHER PUBLICATIONS

Shahriar Mirabbasi and Ken Martin, U of Toronto, "Classical and Modern Receiver Architectures", IEEE Communications Magazine, Nov. 2000, pp. 132–139.

Primary Examiner—Hassan Kizou
Assistant Examiner—David Odland
(74) Attorney, Agent, or Firm—IP Creators; Charles C. Cary (57) ABSTRACT

The current invention provides a method and apparatus for downconverting received digital data from the elevated frequencies at which the data is modulated. Various multi-tone communications systems (such as DMT in wire-line communication or OFDM in wireless communication) operate by up-converting output of the modulated signal at the output of the IFFT from baseband to a higher center frequency. Therefore, at the receiver, the inverse operation is required. At the receiver the signal must be down-converted to baseband before being available for processing by the FFT. In this invention, a simplified converter is provided, where the complex multiplication required by prior art downconverters is avoided, thus simplify the downconversion process and reducing power requirements. The apparatus and method may be implemented on a physical modem or a logical modem with the logical modem including a digital signal processor (DSP) coupled to an analog front end (AFE). The communication medium may include: wired, wireless and optical. The present invention provides a signal processing architecture that supports scalability of CO/DLC/ONU resources, and allows a significantly more flexible hardware response to the evolving X-DSL standards without over committing of hardware resources. As standards evolve hardware may be reconfigured to support the new standards.

21 Claims, 7 Drawing Sheets

METHOD AND APPARATUS FOR DOWN CONVERSION WITHIN AN X-DSL RECEIVER

CROSS REFERENCE TO RELATED APPLICATION

This application is a continuation of copending U.S. application Ser. No. 09/757,008 filed Jan. 8, 2001 entitled "Method and Apparatus for Down Conversion Within An X-DSL Receiver" which claims the benefit of prior filed Provisional Applications No. 60/175,011 filed on Jan. 7, 2000 entitled "DIGITAL DOWN CONVERTER/DECIMATOR FOR A VDSL RECEIVER". Each of the above-cited applications is incorporated herein by reference in its entirety.

BACKGROUND OF THE INVENTION

1. Field of Invention

This invention relates generally to X-DSL communications, and more particularly, X-DSL communications employing a DMT line code.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, SDSL, MDSL, RADSL, HDSL, etc. all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation.

X-DSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop. Modems essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bit stream and optionally provide error correction, echo cancellation, and line equalization, and (c) a host interface between the information bit stream and its source/destination. Typically all of these components are located on a highly integrated single line card with a dedicated connection between one or more AFE's and a DSP.

Within each X-DSL protocol there are at least two possible line codes, or modulation protocols; i.e. discrete multi-tone (DMT) and carrierless AM/PM (CAP). The first of these line codes, i.e. DMT, requires the DSP to implement both an inverse fast Fourier transform (IFFT) on upstream data received from the subscriber and a fast Fourier transform (FFT) on the downstream data transmitted to the subscriber. Typically the DSP is available as a discrete semiconductor chip which implements the transforms for a dedicated one of the X-DSL standards using software routines running on an internal processor.

Each X-DSL installation represents a sizeable expense in hardware and service labor to provision the central office. The expense may not always be amortized over a sufficient period of time due the relentless introduction of new and faster X-DSL standards each of which pushes the performance boundaries of the subscriber line in the direction of increasing bandwidth and signal integrity. As each new standard involves, line cards must typically be replaced to upgrade the service.

Typically new line codes extend the frequency range of prior line codes. Typically demodulating and modulating data transmitted within these higher frequency ranges requires changes across the transmit and receive paths of the corresponding modems. The sampling rate increases, the sample sets for the DFT/IDFT associated with DMT modulated data needs to be increased. These and other changes greatly increase the cost and form factor of the corresponding physical or logical modem.

What is needed are communication techniques which provide access to these higher frequency ranges at a reduced cost, and without the complexity associated with prior art X-DSL modems.

SUMMARY OF THE INVENTION

The current invention provides a method and apparatus for downconverting received digital data from the elevated frequencies at which the data is modulated. Various multi-tone communications systems (such as DMT in wire-line communication or OFDM in wireless communication) operate by up-converting output of the modulated signal at the output of the IFFT from baseband to a higher center frequency. Therefore, at the receiver, the inverse operation is required. At the receiver the signal must be down-converted to baseband before being available for processing by the FFT. In this invention, a simplified converter is provided, where the complex multiplication required by prior art downconverters is avoided, thus simplify the downconversion process and reducing power requirements.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The current invention provides a method and apparatus for downconverting received digital data from the elevated frequencies at which the data is modulated. Various multi-tone communications systems (such as DMT in wire-line communication or OFDM in wireless communication) operate by up-converting output of the modulated signal at the output of the IFFT from baseband to a higher center frequency. Therefore, at the receiver, the inverse operation is required. At the receiver the signal must be down-converted to baseband before being available for processing by the FFT. In this invention, a simplified converter is provided, where the complex multiplication required by prior art downconverters is avoided, thus simplify the downconversion process and reducing power requirements. The apparatus and method may be implemented on a physical modem or a logical modem with the logical modem including a digital signal processor (DSP) coupled to an analog front end (AFE). The communication medium may include: wired, wireless and optical. The present invention provides a signal processing architecture that supports scalability of CO/DLC/ONU resources, and allows a significantly more flexible hardware response to the evolving X-DSL standards without over committing of hardware resources. As standards evolve hardware may be reconfigured to support the new standards.

Figure 1:
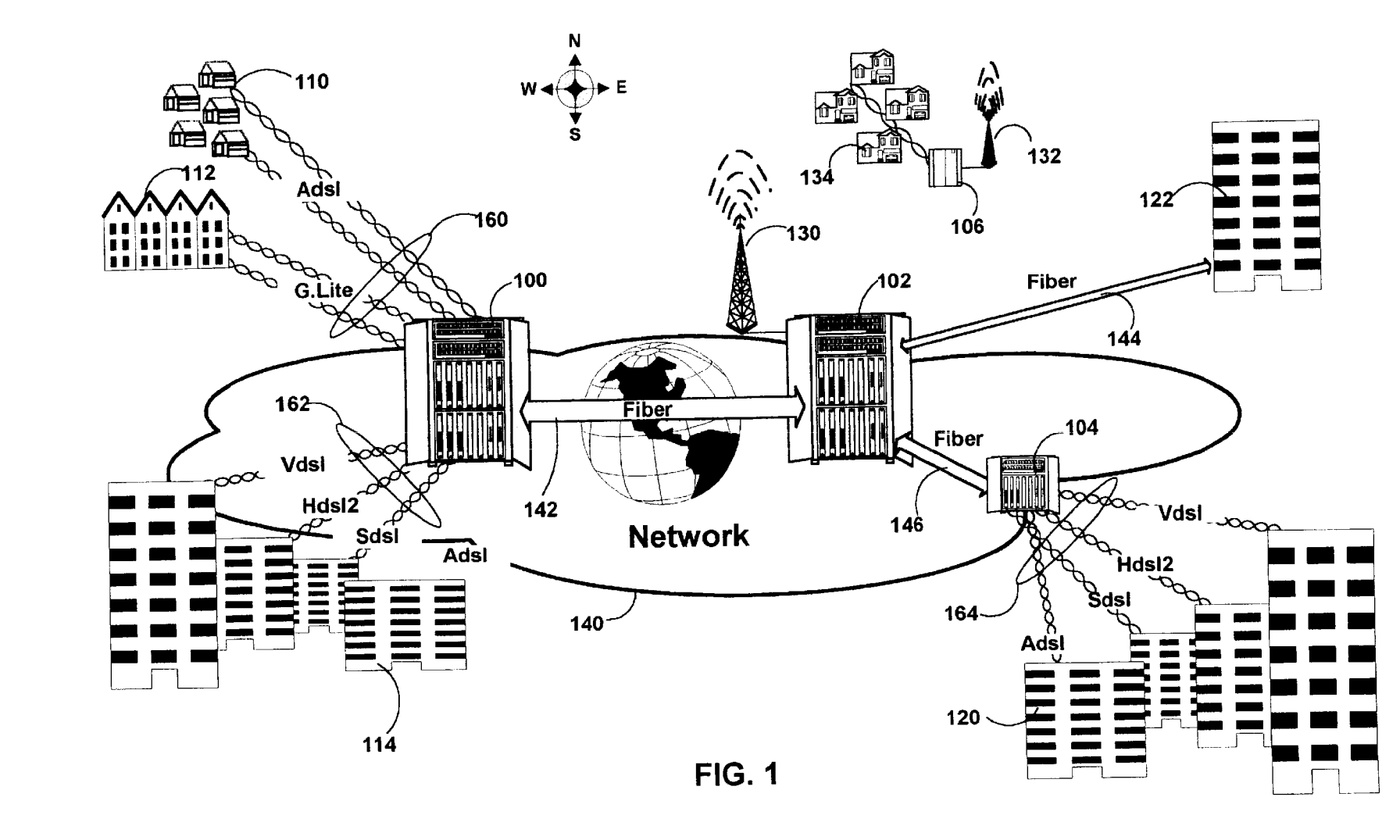
FIG. 1 depicts an overall system environment in which individual subscribers are coupled across public service telephone network (PSTN) subscriber lines with one or more high speed networks.

FIG. 1 depicts an overall system environment in which individual subscribers are coupled across public service telephone network (PSTN) subscriber lines with one or more high speed networks. Telco COs 100, 102, 106 and remote access terminal 104 are shown coupling various subscribers to one another and to a high speed network 140. The high speed network 140 provides fiber optic links between the central office and remote access terminal. CO's 100–102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines. On these subscriber lines voice band and data communication are provided. The data communication is shown as various X-DSL protocols including G.Lite, ADSL VDSL, and HDSL2. CO 100 is coupled via G.Lite and ADSL modulated subscriber line binder 160 with subscribers 110 and 112. CO 100 is also coupled via G.Lite and ADSL modulated subscriber line binder 162 with subscriber 114. CO 106 is also coupled via a subscriber line to subscriber 134. Remote access terminal is coupled via subscriber line binder 164 with subscribers 120. In each case the corresponding CO may advantageously be provided with distributed AFE and DSP resources for handling multiple protocols from multiple locations with the added benefit of load balancing, and statistical multiplexing. The apparatus and method of the current invention is suitable for handling communications on any of these subscriber lines. Communications are also provided between DSP resources at one site, e.g. CO 100 and AFE resources at a separate site, e.g. CO 102. This later capability allows distributed processing whereby all DSP resources can be placed in a logical server environment hence supporting a client server architecture.

Figure 2:
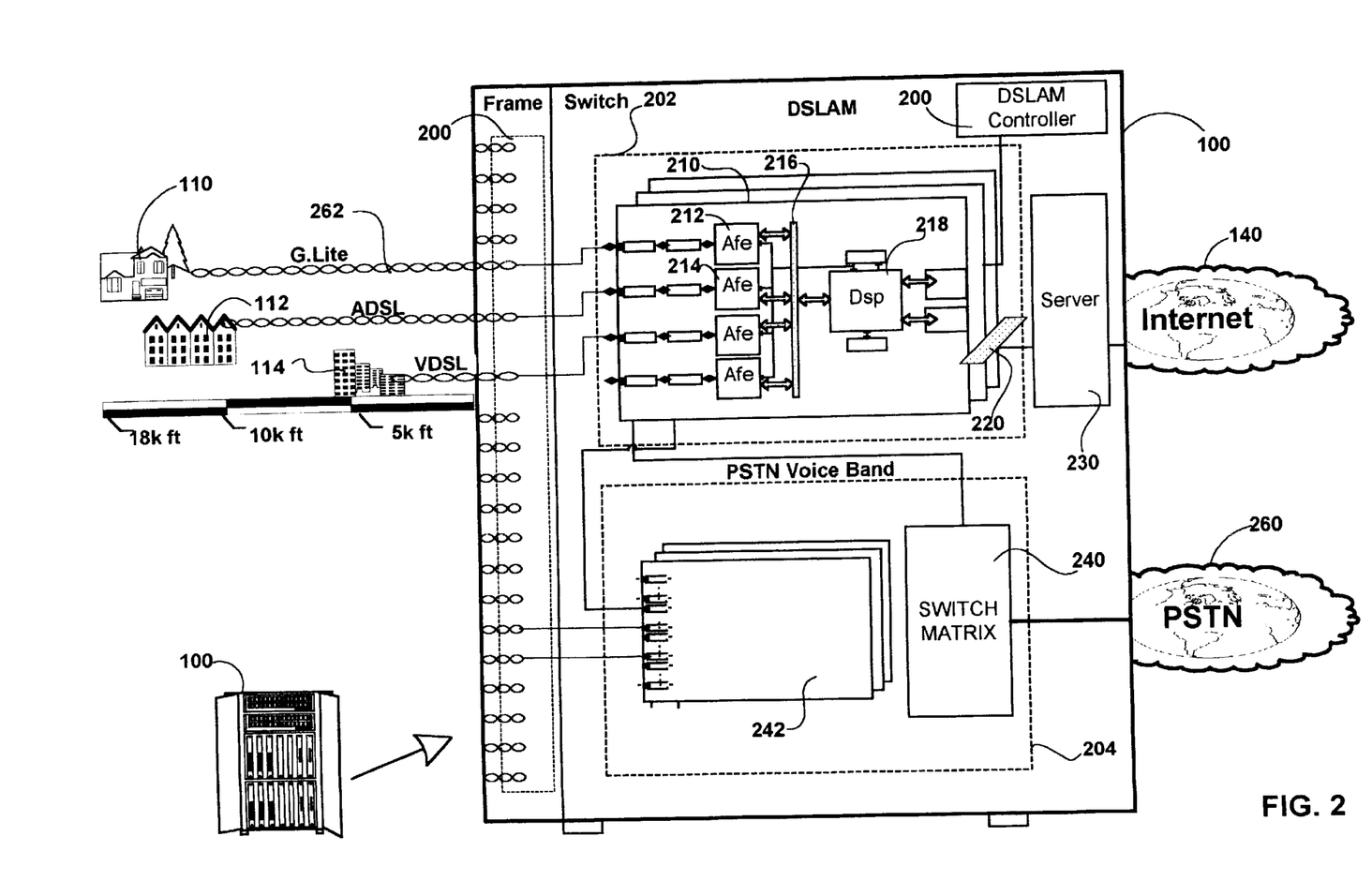
FIG. 2 depicts a more detailed view of a representative one of the central offices shown in FIG. 1 including both digital subscriber line access modules (DSLAMs) and PSTN voice band modules.

FIG. 2 depicts a more detailed view of a representative one of the central offices shown in FIG. 1 including both digital subscriber line access modules (DSLAMs) and PSTN voice band modules. The CO 100 includes subscriber line connections to subscribers 110–114. Subscriber line 262 couples subscriber 110 with the CO. Each of these connections terminates in the frame room 200 of the CO. From this room connections are made for each subscriber line via splitters and hybrids to both a DSLAM 202 and to the voice band racks 204. The splitter shunts voice band communications to dedicated line cards, e.g. line card 242 or to a voice band modem pool (not shown). The splitter shunts higher frequency X-DSL communications on the subscriber line to a selected line card 210 within DSLAM 202. The line cards of the current invention are universal, meaning they can handle any current or evolving standard of X-DSL and may be upgraded on the fly to handle new standards.

Voice band call set up is controlled by a Telco switch matrix 240 such as SS7. This makes point-to-point connections to other subscribers for voice band communications on the Public Switched Telephone Network (PSTN) 260. The X-DSL communications may be processed by a universal line card such as line card 212. That line card includes a plurality of AFE's e.g. 212–214 each capable of supporting a plurality of subscriber lines. The AFEs are coupled via a proprietary packet based bus 216 to a DSP 218 which is also capable of multi-protocol support for all subscriber lines to which the AFE's are coupled. The line card itself is coupled to a back-plane bus 220 which may in an embodiment of the invention be capable of offloading and transporting low latency X-DSL traffic between other DSPs for load balancing. Communications between AFE's and DSP(s) are packet based thereby allowing a distributed architecture such as that shown in the following FIG. 3. Each of the DSLAM line cards operates under the control of a DSLAM controller 200 which handles global provisioning, e.g. allocation of subscriber lines to AFE and DSP resources. Once an X-DSL connection is established between the subscriber and a selected one of the DSLAM submodules, e.g. AFE and DSP the subscriber will be able to access any network to which the DSLAM is connected. In the example shown the DSLAM couples via server 230 with Internet 140.

Figure 3:
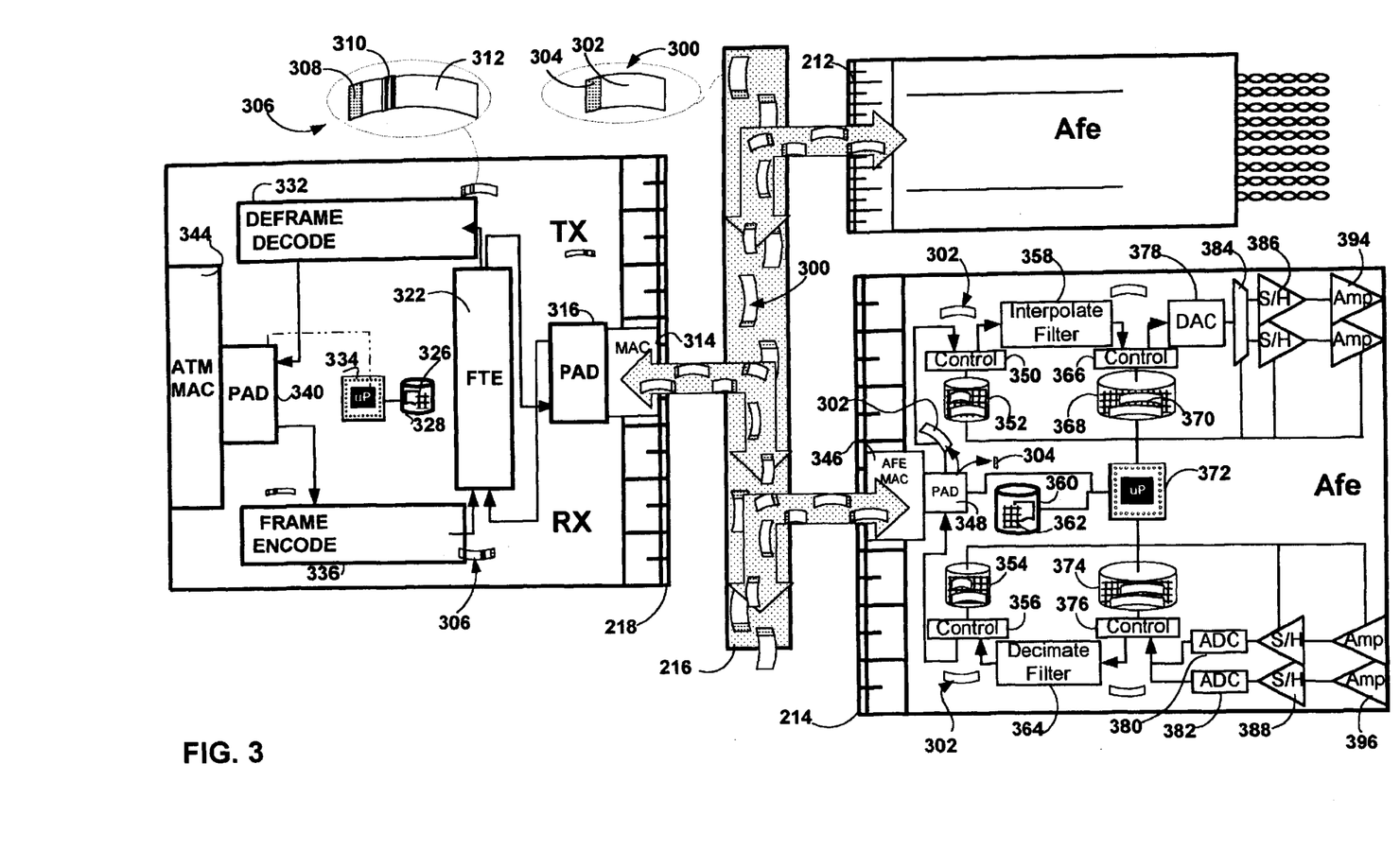
FIG. 3 is an expanded hardware view of one of the line cards in the central office shown in FIG. 2 which includes the digital down converter in accordance with an embodiment of the invention.

FIG. 3 is a chip level view of an embodiment of the invention implemented within a logical modem formed on line card 210 by the DSP 218 and AFE 214. The AFE's chips 212–214 connect with a DSP chip 218 across bus 216. They all may be mounted on the line card 210 shown in FIG. 2. Packets of raw data are shown being transported between the DSP and AFEs as well as within each DSP and AFE. Packet processing between the DSP and AFE chips involves transfer of bus packets 300. Packet processing within a DSP may involve device packets 306 (See FIG. 5). Packet processing within an AFE may involve raw data packets 302. These will be discussed in the following text.

These modules, AFE and DSP, may be found on a single universal line card, such as line card 210 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 218 includes an upstream receive path and a downstream transmit path with both discrete and shared components. Data for each of the channels is passed along either path in discrete packets the headers of which identify the corresponding channel and may additionally contain channel specific control instructions for various of the shared and discrete components along either the transmit or receive path.

On the upstream path, upstream packets from subscribers are received by the DSP medium access control (MAC) 314 which handles packet transfers to and from the DSP bus. These packets contain digital data corresponding with DMT symbols expressed in the time domain. There is redundancy in one of the frequency or the time domain for the upstream DMT symbols. Where redundancy in the frequency domain is implemented a single set of DMT symbols contains redundancy of order R for the symbol set. Where redundancy is expressed in the time domain successive sets of DMT symbols contain redundancy of order R. This redundancy implemented with orthogonal coding between channels carried on the subscriber line allows multiple channels to be carried in either the upstream or downstream direction on the subscriber line 262. The MAC couples with a packet assembler/disassembler (PAD) 316. For upstream packets, the PAD handles removal of the DSP bus packet header and insertion of the device header and control header which is part of the device packet 306. The content of these headers is generated by the core processor 334 using information downloaded from the DSLAM controller 200 (See FIG. 2) as well as statistics such as gain tables gathered by the de-framer 332, or embedded operations channel communications from the subscriber side. These channel specific and control parameters 326 are stored in memory 328 which is coupled to the core processor. The PAD 316 embeds the required commands generated by the core processor in the header or control portions of the device packet header of the upstream data packets. The upstream packets may collectively include data from multiple channels each implementing various of the X-DSL protocols both with and without time and/or frequency domain redundancy depending on the subscriber line from which they originated.

The header of each device packet identifies the channel corresponding with the data contained therein. Additionally, a control portion of the packet may include specific control instructions for any of the discrete or shared components which make up the upstream or downstream processing paths. In the embodiment shown, the Fourier transform engine (FTE) 322 is a component which is shared between the upstream and downstream paths. Thus, on the upstream path each upstream packet is delivered to the FTE for demodulation. The FTE handles the mapping of data and the processing of the packets as it flows through the FTE. The information in the header of the packet is used to maintain the channel identity of the data as it is demodulated, to setup the FTE at the appropriate parameters for that channel, e.g. sample size, and to provide channel specific instructions for the demodulation of the data. Next the digitized DMT symbols are decoded, reordered and deframed within the remainder of the deframer decoder 332. Each component in the receive path reads the next device packet and processes the data in it in accordance with the instructions or parameters in its header. The demodulated, decoded and de-framed data is passed to the asynchronous transfer mode (ATM) PAD 340. In the ATM PAD the device packet header is removed and the demodulated data contained therein is wrapped with an ATM header. The packet is then passed to the ATM MAC 344 for transmission of the ATM packet on the ATM network 140 (See FIGS. 1–2).

On the downstream path, downstream packets containing digital data destined for various subscribers is received by the ATM MAC 344 which handles transfers to and from the ATM network 140. The ATM MAC passes each received packet to the ATM PAD 340 where the ATM header is removed and the downstream device packet 306 is assembled. Using header content generated by the core processor 334 the PAD assembles data from the ATM network into channel specific packets each with their own header, data and control portions. The downstream packets are then passed to the Framer, tone orderer, and Reed Solomon encoder 336 where they are processed in a manner consistent with the control and header information contained therein.

The FTE governs the multiplexing of these downstream packets which will be modulated by the FTE with the upstream packets which will be demodulated therein. Each downstream packet with the modulated data contained therein is then passed to the DSP PAD 316. In the DSP PAD the device packet header and control portions are removed, and a DSP bus header 304 is added. This header identifies the specific channel and may additionally identify the sending DSP, the target AFE, the packet length and such other information as may be needed to control the receipt and processing of the packet by the appropriate AFE. The packet is then passed to the DSP MAC for placement on the DSP bus 216 for transmission to the appropriate AFE.

FIG. 3 also shows a more detailed view of the processing of upstream and downstream packets within the AFE. In the embodiment of the invention shown, device packets are not utilized in the AFE. Instead, channel and protocol specific processing of each packet is implemented using control information for each channel stored in memory at session setup. Downstream packets from the DSP are pulled off the bus 216 by the corresponding AFE MAC on the basis of information contained in the header portion of that packet. The packet is passed to AFE PAD 348 which removes the header 304 and sends it to the core processor 372. The core processor matches the information in the header with channel control parameters 362 contained in memory 360. These control parameters may have been downloaded to the AFE at session setup. The raw data 302 portion of the downstream packet is passed to FIFO buffer 352 under the management of controller 350. Each channel has a memory mapped location in that buffer. The interpolator and filter 358 reads a fixed amount of data from each channel location in the FIFO buffer. The amount of data read varies for each channel depending on the bandwidth of the channel. The amount of data read during any given time interval is governed by the channel control parameters 362, discussed above. The interpolator upsamples the data and low pass filters it to reduce the noise introduced by the DSP. Implementing interpolation in the AFE as opposed to the DSP has the advantage of lowering the bandwidth requirements of the DSP bus 216. From the interpolator data is passed to the FIFO buffer 368 under the control of controller 366. The downstream packets 370 may increase in size as a result of the interpolation. The next module. in the transmit pipeline is a DAC 378 which processes each channel in accordance with commands received from the core processor 372 using the control parameters downloaded to the control table 362 during channel setup. The analog output of the DAC is passed via analog mux 384 to a corresponding one of sample and hold devices 386. Each sample and hold is associated with a corresponding subscriber line. The sampled data is filtered in analog filters (not shown) and amplified by line amplifiers 394. The parameters for each of these devices, i.e. filter coefficients, amplifier gain etc. are controlled by the core processor using the above discussed control parameters 362. For example, where successive downstream packets carry downstream channels each of which implements different protocols, e.g. G.Lite, ADSL, and VDSL the sample rate of the analog mux 384, the filter parameters for the corresponding analog filter (not shown) and the gain of the corresponding analog amplifiers 394 will vary for each packet. This "on the fly" configurability allows a single downstream pipeline to be used for multiple concurrent protocols.

On the upstream path many of the same considerations apply. Individual subscriber lines couple to individual line amplifiers 396 through splitter and hybrids (not shown). Each channel is passed through analog filters (not Shown), sample and hold modules 388 and dedicated ADC modules 380–382. As discussed above in connection with the downstream/transmit path, each of these components is configured on the fly for each new packet depending on the protocol associated with it. Each upstream packet is placed in a memory mapped location of FIFO memory 374 under the control of controller 376. From the controller fixed amounts of data for each channel, varying depending on the bandwidth of the channel, are processed by the decimator and filter module 364. The amount of data processed for each channel is determined in accordance with the parameters 362 stored in memory 360. Those parameters may be written to that table during the setup phase for each channel.

From the decimator and filter the raw data 302 is passed to FIFO buffer 354 which is controlled by controller 356. Scheduled amounts of this data are moved to PAD 348 during each bus interval. The PAD wraps the raw data in a DSP header with channel ID and other information which allows the receiving DSP to properly process it. The upstream packet is placed on the bus by the AFE MAC 346. A number of protocols may be implemented on the bus 216. In an embodiment of the invention the DSP operates as a bus master governing the pace of upstream and downstream packet transfer and the AFE utilization of the bus.

Figure 4:
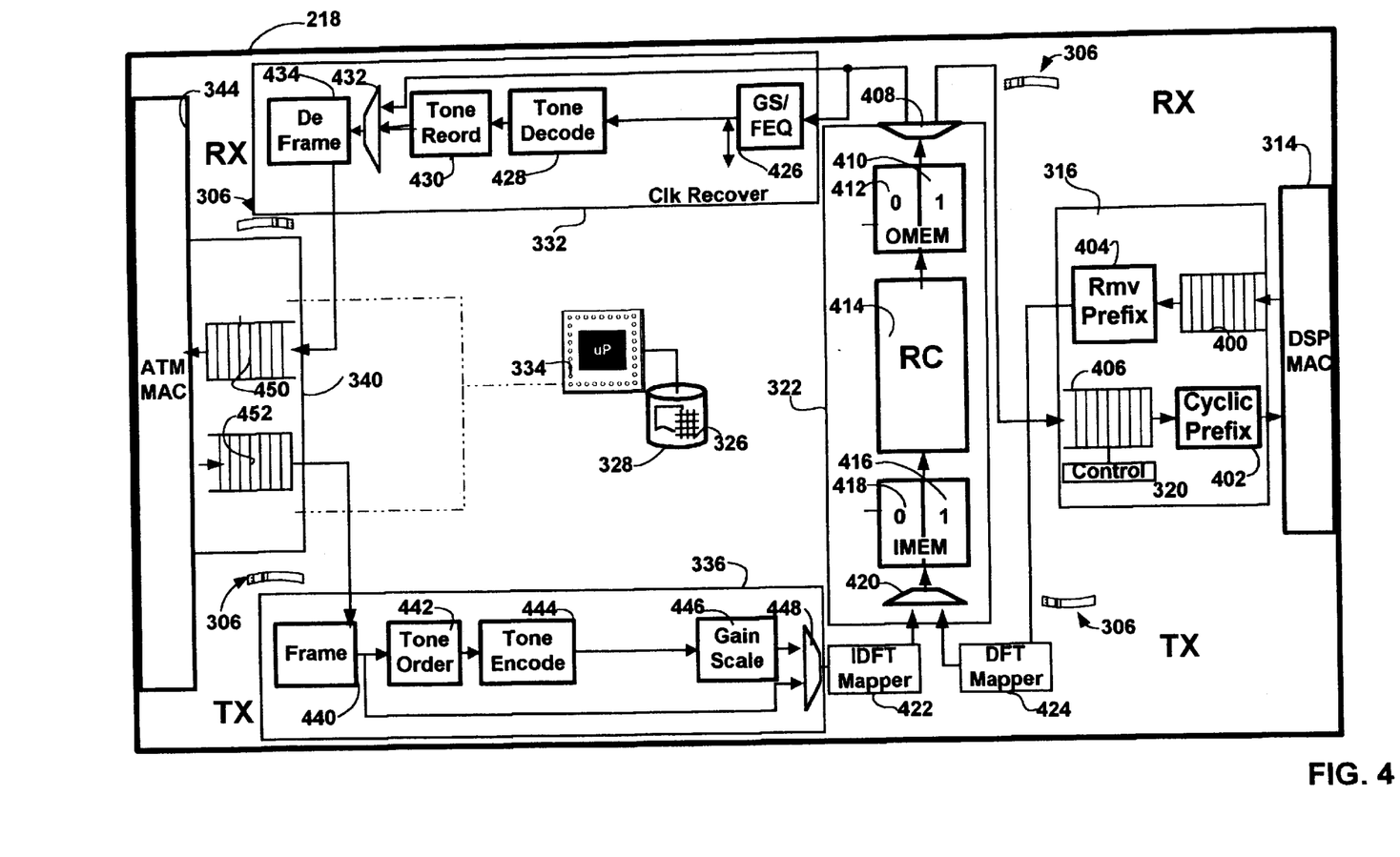
FIG. 4 is an expanded hardware view of the digital signal processor portion (DSP) portion of the line card shown in FIG. 3 showing the enhanced tone reorderer associated with the current invention.

FIG. 4 is an expanded hardware view of the digital signal processor portion (DSP) of the line card shown in FIG. 3. Subcomponents of each of the DSP Pad 316, the FTE 322, the Deframer-decoder 332, the framer-encoder 336 and the AFE PAD 340 are shown.

On the upstream packet path, the AFE PAD includes a first-in-first-out (FIFO) buffer 400 where upstream packets from the AFEs are stored and a cyclic prefix remover 404. After removal of the cyclic prefix each packet is then passed to the DFT mapper 424. The DFT mapper is coupled to the input memory portion of the FTE via a multiplexer 420. The mapper handles writing of each sample set from a packet into the input memory in the appropriate order. The mapper may also handle such additional functions as time domain equalization (TEQ) filtering which is a digital process designed to normalize the impact of differences in channel response. The filter may be implemented as an FIR filter. The input memory comprises two portions 416 and 418. Multiplexer 420 provides access to these memories. While one sample set, e.g. time or frequency domain data, is being written from the upstream or downstream data paths into one of the memories the contents of the other of the memories are written into the row and column component 412 of the FTE 322. Once the DFT is completed by the row and column component the frequency domain coefficients generated thereby are stored in either of portions 410–412 of the output memory of the FTE. These coefficients correspond with each of the DMT subcarriers or tones. A multiplexer 408 handles the coupling of the output memory to either the next component of the upstream path, i.e. the deframer-decoder 332 or of the downstream path. Next on the upstream path, the device packet with header and data portions and optional control portion is passed to the remaining components of the upstream path. These include the gain scalar and optional forward error correction (FEQ) 426, the tone decoder 428, the tone re-orderer 430 and the deframer 434.

A multiplexer 430 couples the deframer input to either the tone reorderer 430 or to the output memory of the FTE. Each of these components is individually configurable on a per channel basis using tables stored locally in registers within each component, or within memory 328. The access to these tables/registers is synchronized by the logic in each of the components which responds to header or control information in each upstream packet to alter tone ordering/re-ordering, gain scaling constants per-tone per-channel, and FEQ constants per-tone per-channel. The processor 334 may initialize all the registers. From the deframer packets are passed to the FIFO buffer 450 which is part of ATM PAD 340.

The core processor 334 has DMA access to the FIFO buffer 450 from which it gathers statistical information on each channel including gain tables, or gain table change requests from the subscriber as well as instructions in the embedded operations portion of the channel. Those tables 326 are stored by the core processor in memory 328. When a change in gain table for a particular channel is called for the core processor sends instructions regarding the change in the header of the device packet for that channel via PAD 316. The core processor 334 then writes the new gain table to a memory, e.g. memory 326, which can be accessed by the appropriate component, e.g. FTE 322 or Gain Scalar 426. As the corresponding device packet is received by the relevant component that component, e.g. the gain scalar applies the updated parameters to appropriately scale the data portion of the packet and all subsequent packets for that channel. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

On the downstream path a FIFO buffer 452 within the AFE PAD 340 holds incoming packets. These are passed to the components in the Framer and Encoder module 336 for processing. The components of that module include the framer 440, tone orderer 442, tone encoder 444, and gain scalar 446. They are coupled via a multiplexer 448 to the IDFT mapper 422. As was the case with the deframer, the framer will use protocol specific information associated with each of these channels to look for different frame and super frame boundaries. The tone orderer supports varying number of tones, bytes per tone and gain per tone for each of the X-DSL protocols. For example the number of tones for G.Lite is 128, for ADSL is 256 and for VDSL 2048. The number of bits to be extracted per tone is read from the tone-ordering table or register at the initiation of processing of each packet. For example as successive packets from channels implementing G.Lite, ADSL and VDSL pass through the DMT Tx engine the number of tones will vary from 128 for G.lite, to 256 for ADSL, to 2048 for VDSL. In the encoder 444 constellation mapping is performed based on the bit pattern of each packet. The output is a two dimensional signal constellation in the complex domain.

Next in the IDFT mapper each device packet is correlated with a channel and protocol and mapped into input memory via a connection provided by multiplexer 420. The mapping is in a row and column order. Next in the FTE, the complex digital symbols DMT symbols are modulated into carriers or tones in the row and column transform component 414 and placed in either portion 410 or 412 of output memory having been transformed from the frequency to the time domain. The dimensions of the row and column transforms vary on a channel specific basis. Next a packet with the memory contents, i.e. the digitized DMT symbols transformed to the time domain is passed as a packet via multiplexer 408 to the DSP FIFO buffer 406. This is part of DSP PAD 316. Individual packets are moved from this buffer to the cyclic prefix component 402 for the addition of the appropriate prefix/suffix. The cyclic prefix component is responsive to the device packet header which identifies the channel for which data is being processed. This can be correlated with the required prefix/suffix extensions for the protocol associated with the channel on the basis of parameters 326 stored in main memory 328 or within dedicated registers in the component. For example the cyclic extension for G.Lite is 16, for ADSL 32, and for VDSL 320.

This device architecture allows the DSP transmit and receive paths to be fabricated as independent modules or submodules which respond to packet header and or control information for processing of successive packets with different X-DSL protocols, e.g. a packet with ADSL sample data followed by a packet with VDSL sampled data. A mixture of different control techniques are used to control the behavior of the individual components of the DSP. The packet header may simply identify the channel. The component receiving the packet may then reference internal registers or downloaded tables such as table 326 to correlate the channel with a protocol and the protocol with the corresponding parameters with which the data portion of the packet is to be processed. Alternately the device packet may contain specific control information such as that associated with shutting down a channel, idling a channel, or shutting down the DSP.

Various multi-tone communications systems (such as DMT in wire-line communication or OFDM in wireless communication) operate by up-converting output of the modulated signal at the output of the IFFT from baseband to a higher center frequency. Therefore, at the receiver, the inverse operation is required, where, the signal must be downconverted to baseband before being available for processing by the FFT. In this invention, a simplified converter is presented, where the complex multiplication required by prior art down-converters is avoided. Assuming there exists only one transmit band, however, this invention can be easily extended to multiple band transmission systems by repeating the circuitry.

Figure 5A:
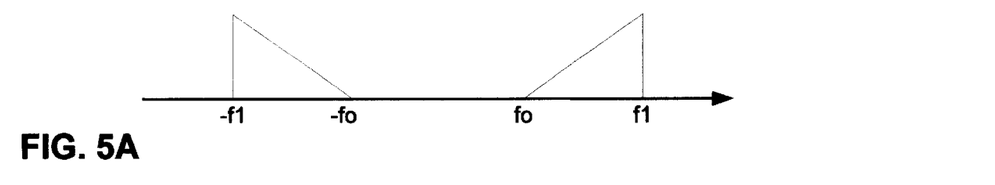
FIGS. 5A–F are signal diagrams showing the spectrum of the received signal at various stages of downconversion and decimation.
Figure 5B:
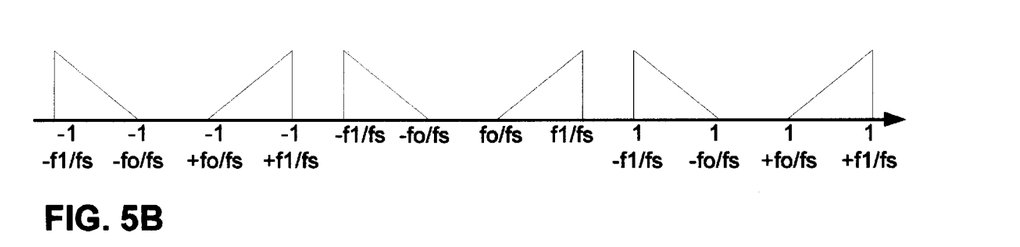
Figure 5C:
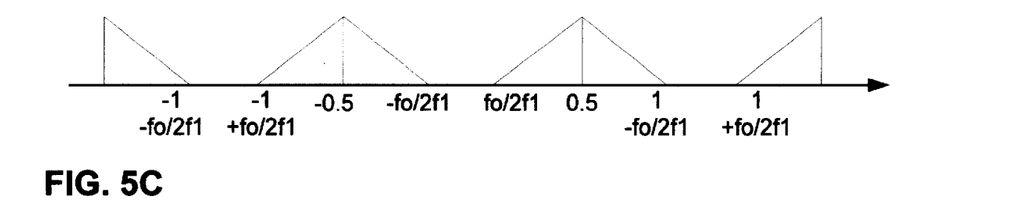
Figure 5D:
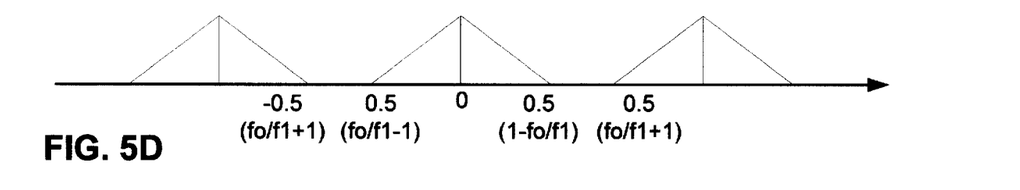
Figure 5E:
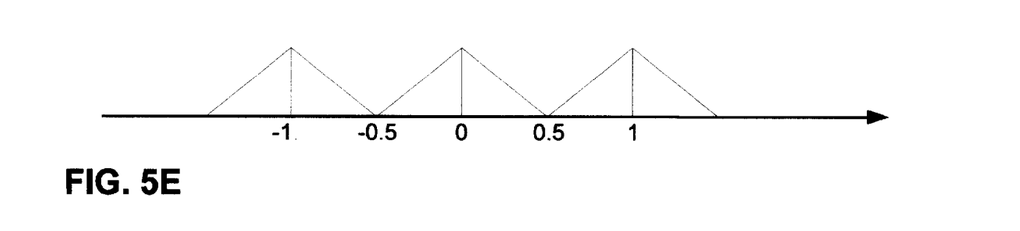
Figure 5F:
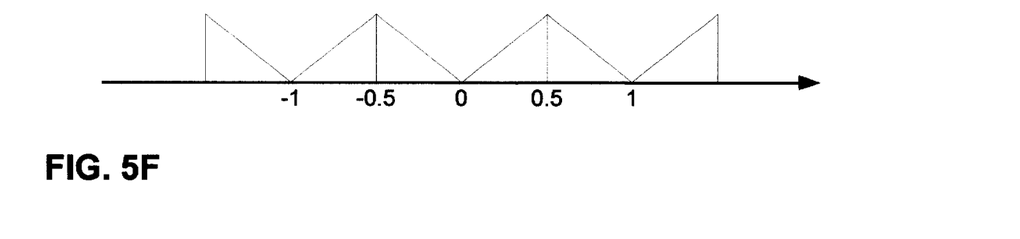
Figure 6:
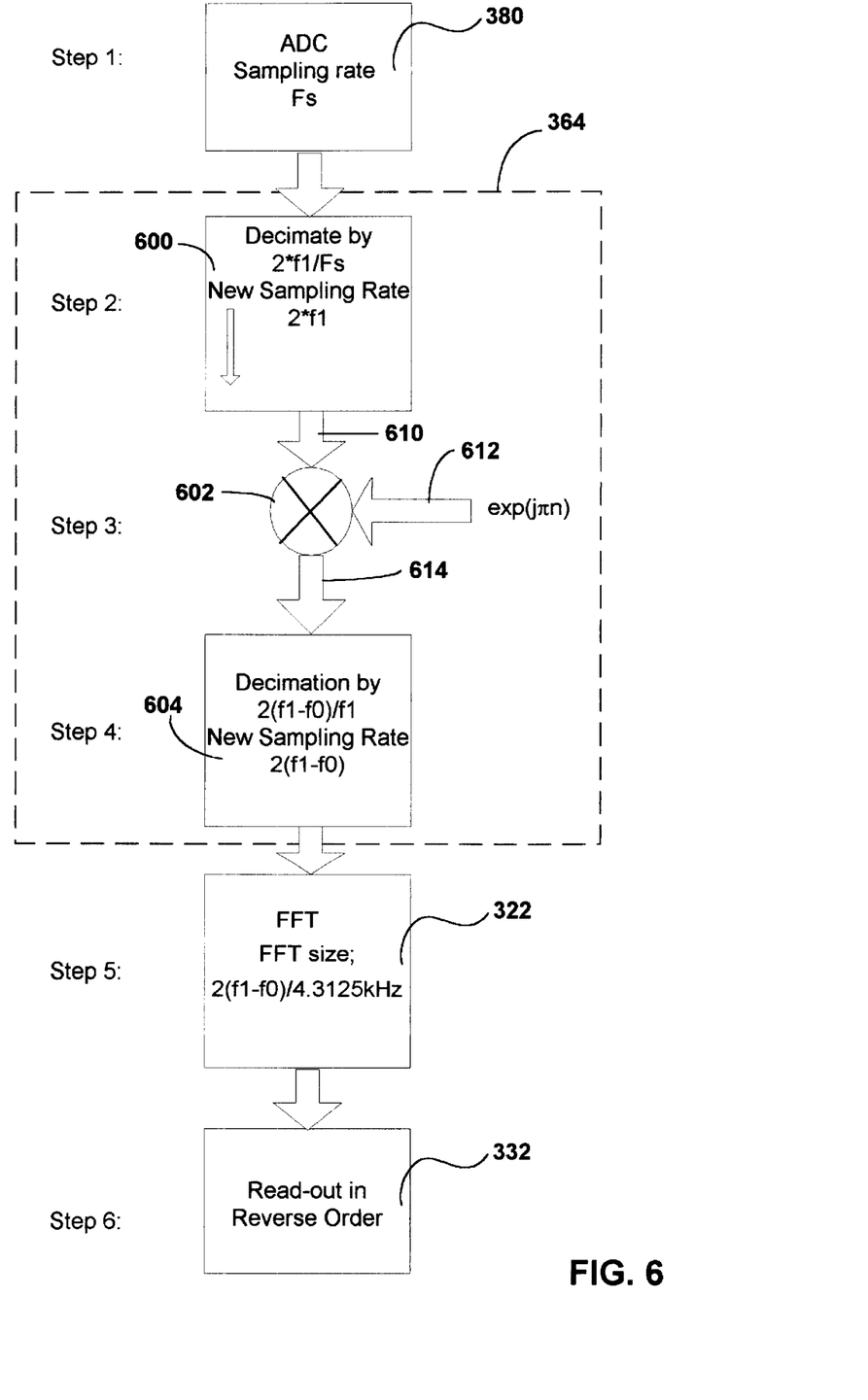
FIG. 6 is a hardware block diagram showing the processing on the receive path associated with down converter and decimator of the current invention.

FIG. 6 is a hardware block diagram showing the processing on the receive path associated with the down converter and decimator of the current invention. The hardware block processing is presented 6 steps accomplished within various physical or logical modules on the receive path. The effect of the processing carried out in each logical block or component on the spectrum of the signal is shown in FIGS. 5A–F. An ADC 380 is shown. The input to ADC 380 is an analog signal. The analog received spectrum at the input of the ADC is presented in FIG. 5A. As shown in this example, the received band is limited to frequencies f0 and f1, where f1>f0>0.

The signal is sampled by ADC and converted to digital (discrete) signals. The sampling rate (fs) is assumed to be greater than the Nyquist rate which is twice the highest frequency occupied by the signal at the input of ADC, 2*f1 ( See FIG. FIG. 5A). The choice for sampling rate is a trade-off between analog and digital processing complexity. The discrete domain spectrum of the signal at the output of the ADC is shown in FIG. 5B.

The next component in the receive path is the first decimator 600. The first decimator receives the sampled signal from the ADC and decimates it to a new sampling rate which is the Nyquist rate, which is twice the highest frequency used by signal. In this example, the new sampling frequency is 2*f1 (See FIG. 5C). In FIG. 5C, the spectrum of the signal is presented after decimation by a factor of 2f1/fs which is the same as decimating to a sampling rate equivalent to a Nyquist rate.

The next component in the receive path is the downconverter 602. The signal from the first decimator is multiplied by the sequence y(n)=exp(j pi n), identified at 612, where n is the time index. The multiplication results in the shift of the signal to a lower frequency. At this lower frequency further decimation is possible since, now, the highest frequency covered by the signal is equal to the bandwidth of the signal (f1–f0)/(2).

Figure 7:
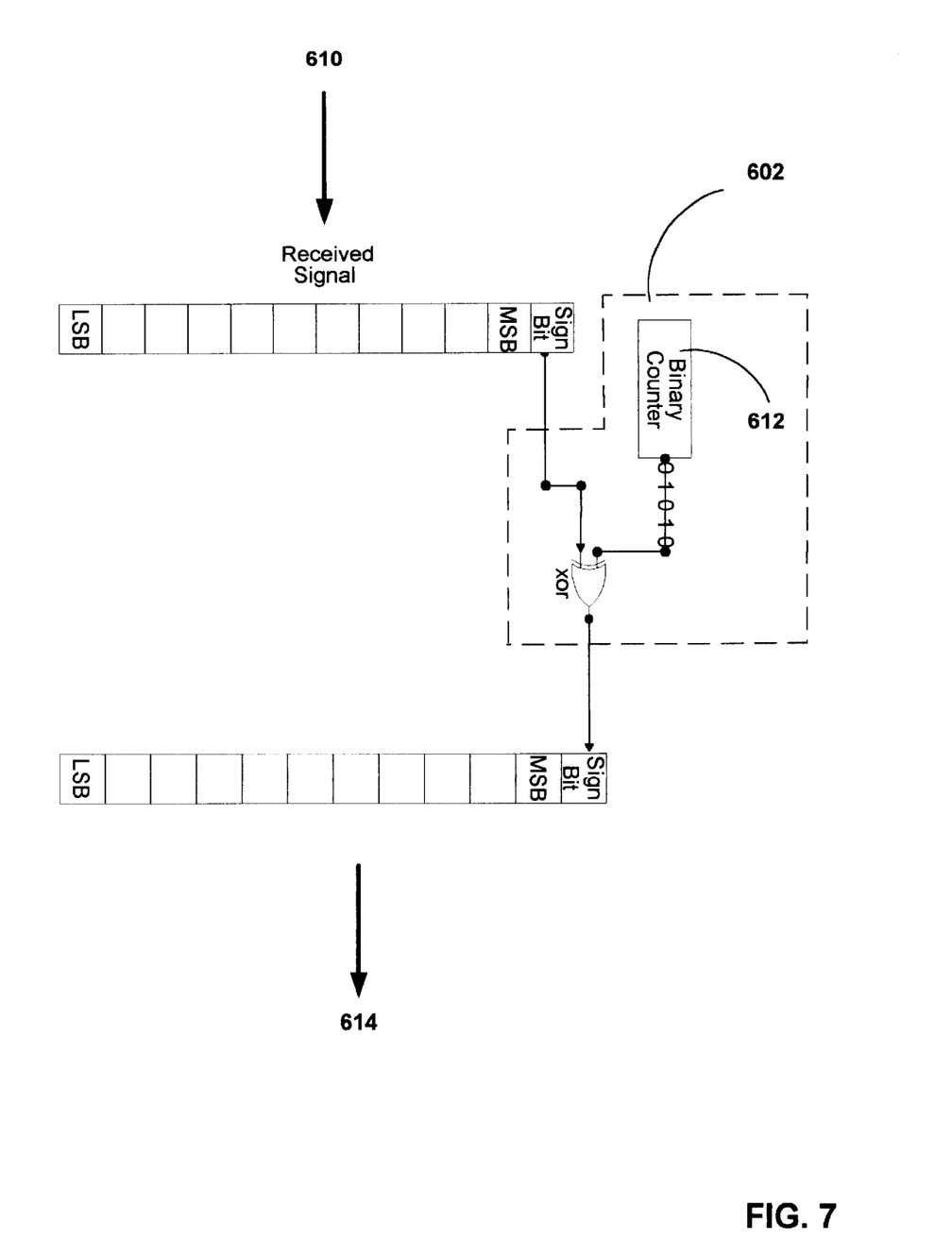
FIG. 7 is an detailed hardware block diagram of a portion of the downconverter/decimator of the current invention.

In an embodiment of the invention where the received signal is sign represented, this operation can be achieved by an exclusive-or (XOR) between a binary counter and the sign bit of the received data (See FIG. 7). When the received signal is represented in twos-complement, it will require activation of an inverter, when y(n)=−1. Either way, the circuitry will be significantly less complex than a corresponding prior art system which utilizes a complex multiplier for down conversion.

The next component in the receive path is the second decimator 604. This decimator decimates by a factor of (f1-f0)/f1 which will bring the sampling rate to twice the bandwidth of the signal (See FIG. 5E).

The next component in the receive path is the frequency inverter portion of the deframer decoder tone reorderer 332. In order to correct the frequency inversion caused by the frequency shift in downconverter 602,612 the signal must be shifted once again via multiplying by expo(j pi n) as shown in FIG. 5F. This step can be replaced by reading the signal in the frequency domain (after the FFT) in reverse order by the tone reorderer.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A communication device for coupling to a communication medium and receiving therefrom an analog signal with a multi-tone communication channel modulated thereon; and the communication device comprising:

a converter with an input coupled to the analog signal and an output, and the converter for converting the analog signal to discrete digital samples at the output, at a sampling rate equivalent to twice a highest frequency exhibited by the multi-tone communication channel;

a downconverter with an input coupled to the output of the converter and an output, and the downconverter to downconvert the communication channel to a zero center frequency and the downconversion corresponding with a multiplication of the discrete digital samples by a sequence exp (jπn) where n is a time index;

a decimator with an output and an input coupled to the output of the downconverter to decimate the discrete digital samples output therefrom to a sampling rate corresponding with twice the highest frequency exhibited after downconversion by the downconverter;

a fourier transform engine coupled to the output of the decimator for converting the communication channel from a time to a frequency domain and outputting an ordered set of tones corresponding thereto; and a tone re-orderer to re-order in a reverse order the ordered set of tones from the fourier transform engine.

2. The communication device of claim 1, wherein the converter comprises:

an analog-to-digital converter for sampling the analog signal at a sampling rate greater than twice the highest frequency exhibited by the multi-tone communication channel; and an accompanying decimator to decimate the samples provided by the analog-to-digital converter to twice the highest frequency exhibited by the multi-tone communication channel.

3. The communication device of claim 1, wherein the downconverter comprises:

binary logic for inverting a sign of alternating ones of the discrete digital samples to effect the multiplying of the discrete digital samples by the sequence exp (jπn).

4. The communication device of claim 3, wherein the binary logic comprises for digital samples expressed in a sign magnitude format:

a binary counter outputting a binary stream alternating between "0" and "1" for each successive one of the digital samples; and an "XOR" logic gate with a first and a second input and an output, and with the first input coupled to receive a sign bit of successive ones of the digital samples and the second input coupled to the binary counter and with the down-conversion effected by an inversion of the sign bit of alternating ones of the discrete digital samples as effected at the output of the XOR.

5. The communication device of claim 3, wherein the binary logic comprises for digital samples expressed in a two's compliment format:

a binary counter outputting a binary stream alternating between "0" and "1" for each successive one of the digital samples; and an inverter coupled to binary counter to invert a sign of the digital samples when the binary counter output equals "1".

6. The communication device of claim 1, wherein the multi-tone communication channel exhibits a discrete multi-tone (DMT) modulation.

7. The communication device of claim 1, with the various elements thereof configured to form a receive path of a physical modem.

8. The communication device of claim 1, with the various elements thereof configured to form a receive path of a logical modem.

9. The communication device of claim 1, wherein the communication medium includes at least one of a wired communication medium and a wireless communication medium.

10. A method for receiving an analog signal with a multi-tone communication channel modulated thereon; and the method comprising:

converting the analog signal to discrete digital samples at a sampling rate equivalent to twice a highest frequency exhibited by the multi-tone communication channel;

down-converting the discrete digital samples converted in said converting act to a zero center frequency for the communication channel and the downconversion corresponding with a multiplication of the discrete digital samples by a sequence exp (jπn) where n is a time index;

decimating the down-converted discrete digital samples down-converted in the down-converting act to a sampling rate corresponding with twice the highest frequency exhibited by the communication channel after down conversion in the down converting act;

converting the decimated digital samples decimated in the decimating to an ordered set of tones in a frequency domain; and re-ordering in a reverse order the ordered set of tones converted in the converting act.

11. The method of claim 10, wherein the converting act further comprises:

sampling the analog signal at a sampling rate greater than twice the highest frequency exhibited by the multi-tone communication channel; and decimating the samples provided by the sampling act to twice the highest frequency exhibited by the multi-tone communication channel.

12. The method of claim 10, wherein the down converting act further comprises:

inverting a sign of alternating ones of the discrete digital samples to effect the multiplying of the discrete digital samples by the sequence exp (jπn).

13. The method of claim 10, with the digital samples expressed in a sign magnitude format and wherein the inverting act further comprises the acts of:

generating a binary stream alternating between "0" and "1" for each successive one of the digital samples; and performing an "XOR" logic operation on a pair of inputs comprising the binary stream generated in the generating act and a sign bit of successive ones of the digital samples to effect the down conversion by an inversion of the sign bit of alternating ones of the discrete digital samples.

14. The method of claim 10, with the digital samples expressed in a twos compliment format and wherein the inverting act further comprises:

generating a binary stream alternating between "0" and "1" for each successive one of the digital samples; and performing an "XOR" logic operation on a pair of inputs comprising the binary stream generated in the generating act and a sign bit of successive ones of the digital samples to effect a portion of the down conversion by an inversion of the sign bit of alternating ones of the discrete digital samples; and inverting such additional bits of the alternating ones of the discrete digital samples as may be required by the twos compliment format.

15. The method of claim 10, wherein the multi-tone communication channel exhibits a discrete multi-tone (DMT) modulation.

16. The method of claim 10, wherein the communication medium includes at least one of a wired communication medium and a wireless communication medium.

17. A means for receiving an analog signal with a multi-tone communication channel modulated thereon; and the means comprising:

means for converting the analog signal to discrete digital samples at a sampling rate equivalent to twice a highest frequency exhibited by the multi-tone communication channel;

means for down converting the discrete digital samples converted by said means for converting act to a zero center frequency for the communication channel and the down conversion corresponding with a multiplication of the discrete digital samples by a sequence exp $(j\pi n)$ where n is a time index;

means for decimating the down-converted discrete digital samples down-converted by the means for down-converting to a sampling rate corresponding with twice the highest frequency exhibited by the communication channel after down conversion by the means for down conversion;

means for converting the decimated digital samples decimated in the means for decimating to an ordered set of tones in a frequency domain; and means for re-ordering in a reverse order the ordered set of tones converted in the converting act.

18. The means for receiving of claim 17, wherein the means for converting further comprises:

means for sampling the analog signal at a sampling rate greater than twice the highest frequency exhibited by the multi-tone communication channel; and means for decimating the samples provided by the means for sampling to twice the highest frequency exhibited by the multi-tone communication channel.

19. The means for receiving of claim 17, wherein the down converting means further comprises:

means for inverting a sign of alternating ones of the discrete digital samples to effect the multiplying of the discrete digital samples by the sequence exp $(j\pi n)$.

20. The means for receiving of claim 19, with the digital samples expressed in a sign magnitude format and wherein the means for inverting further comprises:

means for generating a binary stream alternating between "0" and "1" for each successive one of the digital samples; and means for performing an "XOR" logic operation on a pair of inputs comprising the binary stream generated by the means for generating and a sign bit of successive ones of the digital samples to effect the down conversion by an inversion of the sign bit of alternating ones of the discrete digital samples.

21. The means for receiving of claim 19, with the digital samples expressed in a twos compliment format and wherein the means for inverting further comprises:

means for generating a binary stream alternating between "0" and "1" for each successive one of the digital samples; and means for performing an "XOR" logic operation on a pair of inputs comprising the binary stream generated by the means for generating and a sign bit of successive ones of the digital samples to effect a portion of the down conversion by an inversion of the sign bit of alternating ones of the discrete digital samples; and means for inverting such additional bits of the alternating ones of the discrete digital samples as may be required by the twos compliment format.

* * * * *